US011043676B1

(12) United States Patent
Ansari et al.

(10) Patent No.: US 11,043,676 B1
(45) Date of Patent: Jun. 22, 2021

(54) METHOD AND SYSTEM FOR SILOSILAZANES, SILOSILOXANES, AND SILOXANES AS ADDITIVES FOR SILICON DOMINANT ANODES

(71) Applicant: Enevate Corporation, Irvine, CA (US)

(72) Inventors: Younes Ansari, Irvine, CA (US); Uday Kasavajjula, Irvine, CA (US); Benjamin Park, Mission Viejo, CA (US); Monika Chhorng, Irvine, CA (US); Ambica Nair, Irvine, CA (US); Sanjaya Perera, Irvine, CA (US); David J. Lee, Irvine, CA (US)

(73) Assignee: Enevate Corporation, Irvine, CA (US)

( * ) Notice: Subject to any disclaimer, the term of this patent is extended or adjusted under 35 U.S.C. 154(b) by 0 days.

(21) Appl. No.: 16/705,085

(22) Filed: Dec. 5, 2019

(51) Int. Cl.
| | |
|---|---|
| *H01M 4/38* | (2006.01) |
| *H01M 4/62* | (2006.01) |
| *H01M 4/36* | (2006.01) |
| *H01M 4/02* | (2006.01) |

(52) U.S. Cl.
CPC .......... *H01M 4/628* (2013.01); *H01M 4/366* (2013.01); *H01M 4/386* (2013.01); *H01M 4/621* (2013.01); *H01M 2004/027* (2013.01)

(58) Field of Classification Search
None
See application file for complete search history.

(56) References Cited

U.S. PATENT DOCUMENTS

| | | | | |
|---|---|---|---|---|
| 6,521,290 B1 * | 2/2003 | Kudo | ..................... | C08K 9/06 427/214 |
| 6,534,184 B2 * | 3/2003 | Knasiak | ................. | C08G 77/42 428/447 |
| 2004/0214644 A1 * | 10/2004 | Emori | ................. | G07F 17/3216 463/46 |

(Continued)

OTHER PUBLICATIONS

Niizeki et al., "Structural Study of Silica Coating Thin Layers Prepared from Perhydropolysilazane: Substrate Dependence and Water Penetration Structure," Coatings 2016, 6(4), 64 (Year: 2016).*

(Continued)

*Primary Examiner* — Amanda J Barrow
(74) *Attorney, Agent, or Firm* — McAndrews, Held & Malloy, Ltd.

(57) ABSTRACT

Systems and methods for silosilazanes, silosiloxanes, and siloxanes as additives for silicon-dominant anodes in a battery that may include a cathode, an electrolyte, and an anode active material. The active material may comprise 50% or more silicon as well as an additive including one or more of: silosilazane, silicon oxycarbides, and polyorganosiloxane. The silosilazane may comprise one or more amine groups, silanols, silyl ethers, sylil chlorides, dialkylamoinosilanes, silyl hydrides, and cyclic azasilanes. The active material may comprise a film with a thickness between 10 and 80 microns. The film may have a conductivity of 1 S/cm or more. The active material may comprise between 50% and 95% silicon. The active material may be held together by a pyrolyzed carbon film. The anode may comprise lithium, sodium, potassium, silicon, and/or mix- (Continued)

tures and combinations thereof. The battery may comprise a lithium ion battery. The electrolyte may comprise a liquid, solid, or gel.

12 Claims, 17 Drawing Sheets

(56) References Cited

U.S. PATENT DOCUMENTS

| | | | |
|---|---|---|---|
| 2005/0214644 A1* | 9/2005 | Aramata | H01M 4/58 429/218.1 |
| 2010/0051858 A1 | 3/2010 | Aramata et al. | |
| 2010/0190062 A1* | 7/2010 | Yamamoto | H01M 2/345 429/231.95 |
| 2012/0003383 A1* | 1/2012 | Furuno | H01M 4/1395 427/123 |
| 2012/0121981 A1* | 5/2012 | Harimoto | H01G 11/30 429/213 |
| 2014/0166939 A1* | 6/2014 | Park | H01M 4/0416 252/502 |
| 2014/0274658 A1* | 9/2014 | Sherwood | C04B 35/806 501/154 |
| 2014/0377649 A1* | 12/2014 | Fukui | H01M 4/623 429/217 |
| 2015/0125595 A1* | 5/2015 | Lahlouh | H01M 4/0402 427/122 |
| 2016/0190580 A1* | 6/2016 | Pan | H01M 4/62 252/508 |
| 2017/0144935 A1* | 5/2017 | Singh | H01M 4/66 |
| 2018/0151884 A1 | 5/2018 | Yushin et al. | |
| 2018/0269480 A1* | 9/2018 | Kim | C01B 33/02 |
| 2018/0312641 A1* | 11/2018 | Grottenmuller | C09D 183/16 |
| 2018/0351198 A1* | 12/2018 | Zhamu | H01M 4/623 |
| 2018/0375089 A1* | 12/2018 | Gonser | H01M 10/0525 |
| 2019/0157723 A1* | 5/2019 | Suzuki | H01M 4/364 |
| 2019/0280301 A1* | 9/2019 | Pan | H01M 4/1397 |
| 2020/0377678 A1* | 12/2020 | Browne | C08K 9/06 |

OTHER PUBLICATIONS

L. Fucong et.al. ACS Appl. Mater. Interfaces, 2017, 912, 10699-10707.
International Search Report, PCT/US2020/063011, dated Mar. 4, 2021, 8 pages.

* cited by examiner

METHOD AND SYSTEM FOR SILOSILAZANES, SILOSILOXANES, AND SILOXANES AS ADDITIVES FOR SILICON DOMINANT ANODES

CROSS-REFERENCE TO RELATED APPLICATIONS/INCORPORATION BY REFERENCE

N/A

FIELD

Aspects of the present disclosure relate to energy generation and storage. More specifically, certain embodiments of the disclosure relate to a method and system for silosilazanes, silosiloxanes, and siloxanes as additives for silicon-dominant anodes.

BACKGROUND

Conventional approaches for battery anodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for silosilazanes, silosiloxanes, and siloxanes as additives for silicon-dominant anodes, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
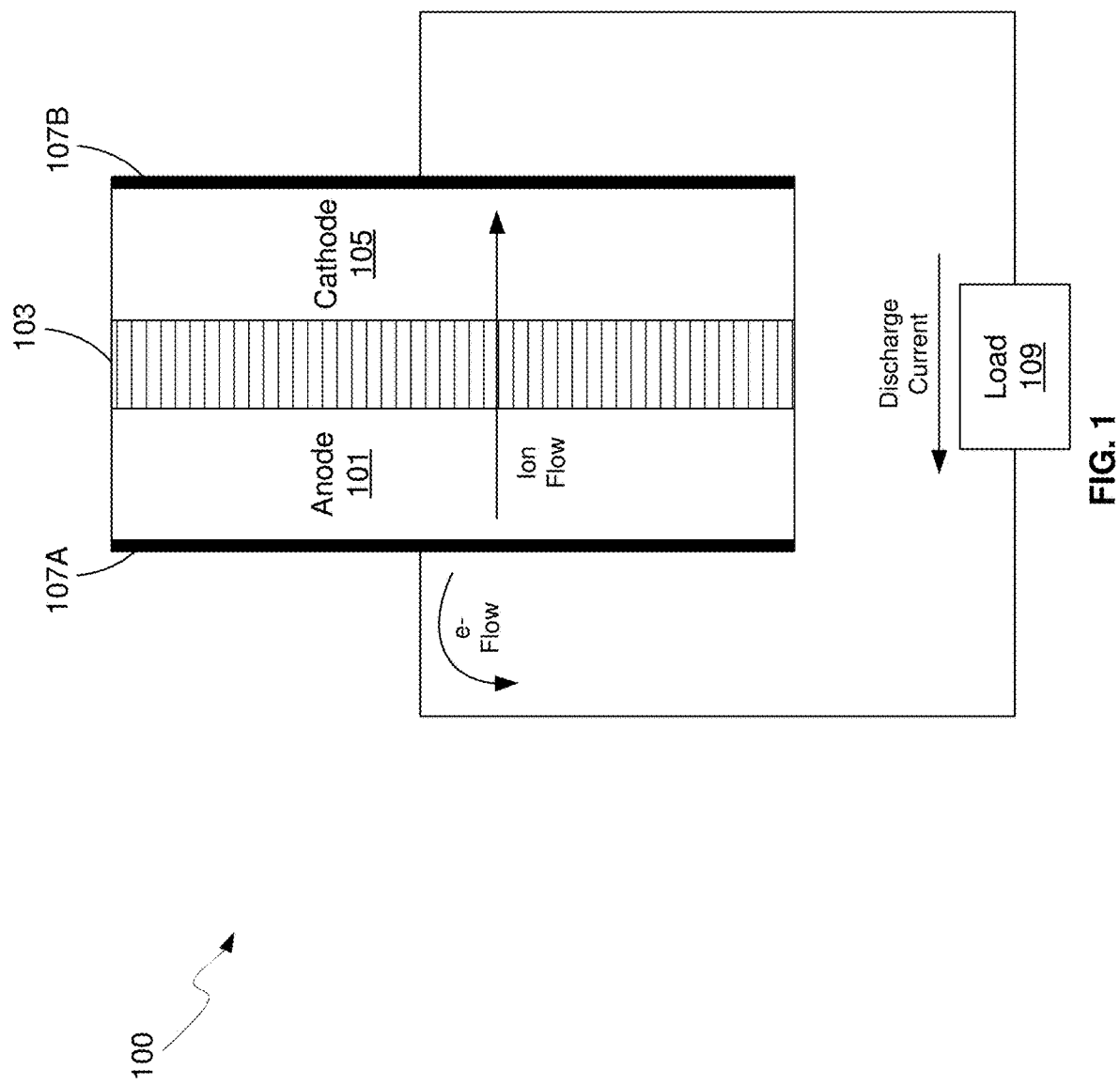
FIG. 1 is a diagram of a battery with silicon-dominant anode with silosilazane, silosiloxane, and/or siloxane additive, in accordance with an example embodiment of the disclosure.

FIG. 1 is a diagram of a battery with silicon-dominant anode with silosilazane, silosiloxane, and/or siloxane additive, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 109 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon, for example. Furthermore, the anode may comprise lithium, sodium, potassium, silicon, and mixtures and combinations thereof.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

An effective solution to improve the performance of silicon dominant anodes is to increase the electrical conductivity of the electrode as well as protecting the surface of silicon particles by adding additives to the slurry. These additives can improve the conductive pathways for electrons, reduce the pulverization, and subsequently minimizing capacity loss in electrode active materials and, thus, enhancing the overall performance of silicon dominant anode batteries. To improve the performance of the silicon-dominant anode batteries, a new class of silicon-containing organic compound has been synthesized and used as an additive in silicon dominant anodes. This class of organopolymer comprises at least a silazane monomer and a silane monomer.

Combining the silazane and silane monomers can improve the thermal stability of these anode materials. The addition of this additive to the anode slurry significantly improves the cyclability of the battery, increases anode conductivity, and creates linear patterns in the anode which can help in reducing anode swelling.

Figure 2:
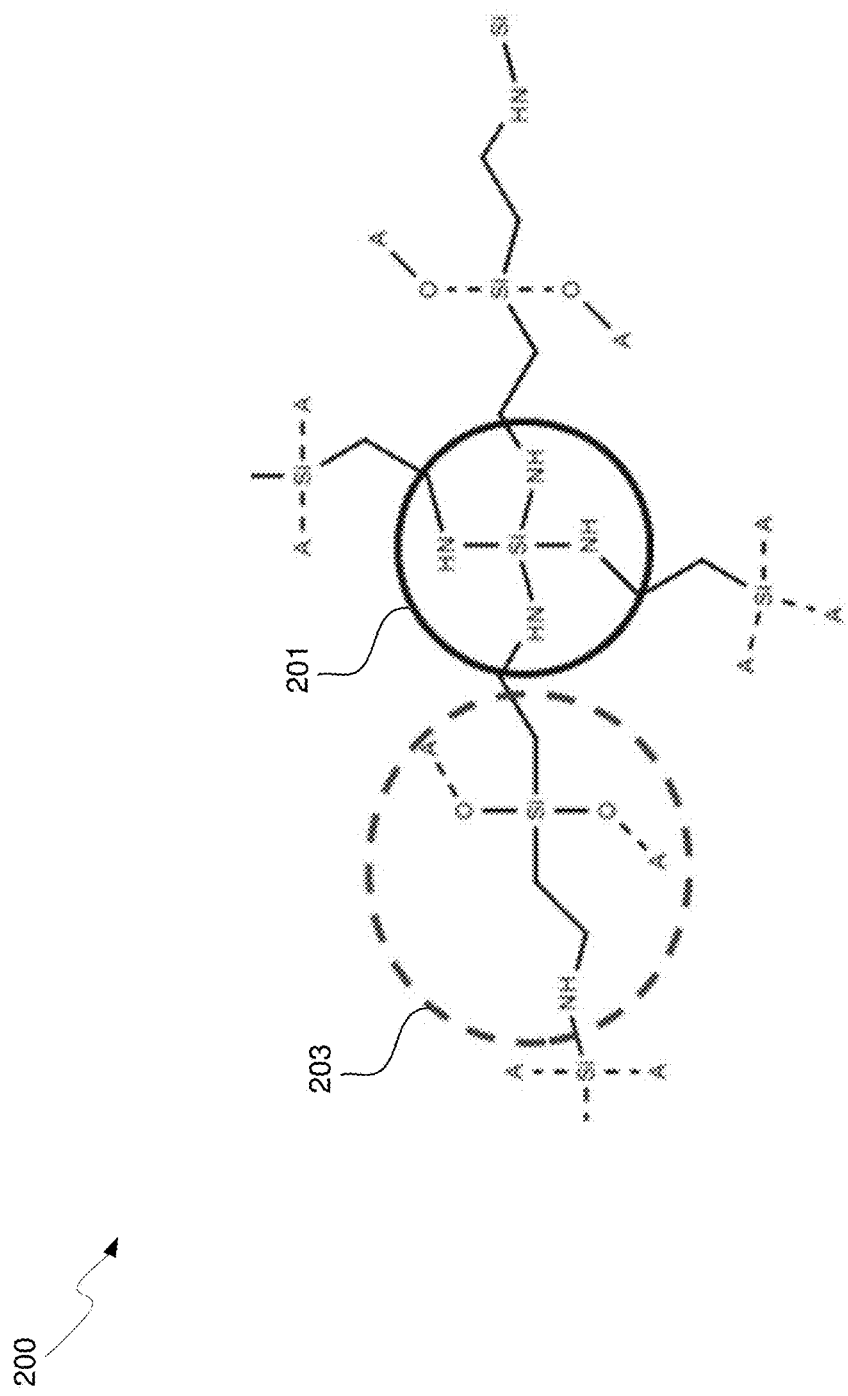
FIG. 2 illustrates the general chemical structure of silosilazanes, in accordance with an example embodiment of the disclosure.

FIG. 2 illustrates the general chemical structure of silosilazanes, in accordance with an example embodiment of the disclosure. Referring to FIG. 2, there is shown silosilazane 200 comprising a silazane group 201 and a silane group 203. The silazane monomer may comprise a hydride of silicon and nitrogen having a straight or branched chain of silicon and nitrogen atoms joined by covalent bonds, and the silane may comprise a group of chemical compounds of silicon and other atoms such as carbon, nitrogen and hydrogen.

Silosilazanes may be synthesized by addition of an appropriate amount of $SiCl_4$ to silanes in a diluent such as N-Methyl-2-Pyrrolidone (NMP) solution, which is a polar solvent. In one example, 0.5 grams of $SiCl_4$ (0.33 ml) may be added to a solution of [3-(2-Aminoethylamino)propyl]trimethoxysilane (3.0 grams) in NMP (5 grams) to form a colorless, transparent solution. The product is formed by releasing HCl gas through an exothermic reaction.

In another example, polysilosilazane may be synthesized by adding 13.82 grams of $SiCl_4$ (9.3 ml) to a solution of [3-(2-Aminoethylamino)propyl]trimethoxysilane (36.82 grams) in NMP (50 grams) in an ice bath to form an orange, translucent solution after releasing considerable amount of HCl gas.

Figure 3A:
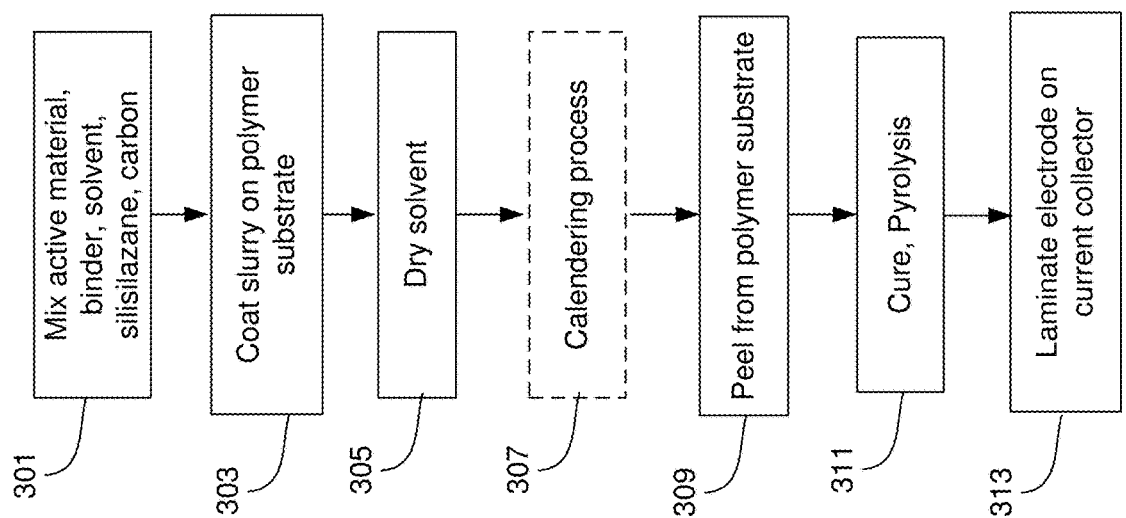
FIG. 3A illustrates a process flow for fabricating a silicon-dominant anode with silosilazane additive, in accordance with an example embodiment of the disclosure.

FIG. 3A illustrates a process flow for fabricating a silicon-dominant anode with silosilazane additive, in accordance with an example embodiment of the disclosure. While conventional processes to fabricate composite electrodes physically mix the active material, conductive additive, and binder together and coat directly on a current collector, this disclosure employs a high-temperature pyrolysis process coupled with a lamination process. After the raw electrode materials are mixed, they may be coated on a substrate. The active layer may then be then peeled into sheets, cut into desired size, cured, and then and undergone pyrolysis at high-temperature to form an anode coupon with high Si content. The anode coupon is then laminated on an adhesive-coated current collector.

This process is shown in the flow diagram of FIG. 3A, starting with step 301 where the active material may be mixed with a binder/resin such as polyimide (PI) or polyamide-imide (PAI), solvent, the silosilazane additive, and optionally a conductive carbon. In an example scenario, silicon powder (5-20 μm particle size, for example) may be dispersed in NMP and silosilazane solution with the amount of silosilazane being 1.2% with respect to silicon. Polyamic acid resin (15% solids in NMP) may be added to the mixture at 500 rpm for 10 minutes, and further dispersed between 700-1000 rpm for several hours to achieve a slurry viscosity within 1500-3000 cP (total solid content of about 30%).

In an example scenario, the silosilazane may comprise between 1% and 20% of the slurry. The silosilazane may comprise one or more amine groups. In another example scenario, the silosilazane may comprise an organosilosilazane comprising amines and one or more silanols, silyl ethers, sylil chlorides, dialkylamoinosilanes, silyl hydrides, and/or cyclic azasilanes. After mixing the silosilazane with the silicon, they may be referred to as silosilazane-treated silicon particles, which may comprise silicon oxide surfaces reacted with the one or more organosilosilazanes.

In step 303, the slurry may be coated on a polymer substrate, such as polyethylede terephthalate (PET), polypropylene (PP), or Mylar. The slurry may be coated on the PET/PP/Mylar film at a loading of 3-4 mg/cm$^2$ (with 15% solvent content), and then dried to remove a portion of the solvent in step 305. An optional calendering process may be utilized where a series of hard pressure rollers may be used to finish the film/substrate into a smoothed and denser sheet of material.

In step 309, the green film may then be removed from the PET, where the active material may be peeled off the polymer substrate, the peeling process being optional for a polypropylene (PP) substrate, since PP can leave ~2% char residue upon pyrolysis. The peeling may be followed by a cure and pyrolysis step 311 where the film may be cut into sheets, and vacuum dried using a two-stage process (120° C. for 15 h, 220° C. for 5 h). The dry film may be thermally treated at 1175° C. to convert the polymer matrix into carbon.

In step 313, the pyrolyzed material may be laminated on the current collector, where a 15 μm thick copper foil may be coated with polyamide-imide with a nominal loading of 0.45 mg/cm$^2$ (applied as a 6 wt % varnish in NMP, dried 16 h at 110° C. under vacuum). The silicon-carbon composite film may be laminated to the coated copper using a heated hydraulic press (50 seconds, 300° C., and 4000 psi), thereby forming the finished silicon-composite electrode.

The addition of silosilazanes to silicon-dominant (e.g., >50% silicon) anodes provides advantages such as decreased cell resistance, improved cyclability, self-assembly patterns, and reduced swelling. The anode active material may comprise ridges formed in a manner consistent with self-assembly. These long ridges may provide a structural advantage in absorbing the strain from swelling from silicon lithiation. The film may be substantially held together by the partially or fully pyrolyzed carbon film. The resulting film may be on the order of 10 to 100 μm thick and have a conductivity of 1 Siemen/cm (S/cm) or more. In an example scenario, the anode active material may comprise 50-95% silicon.

Figure 3B:
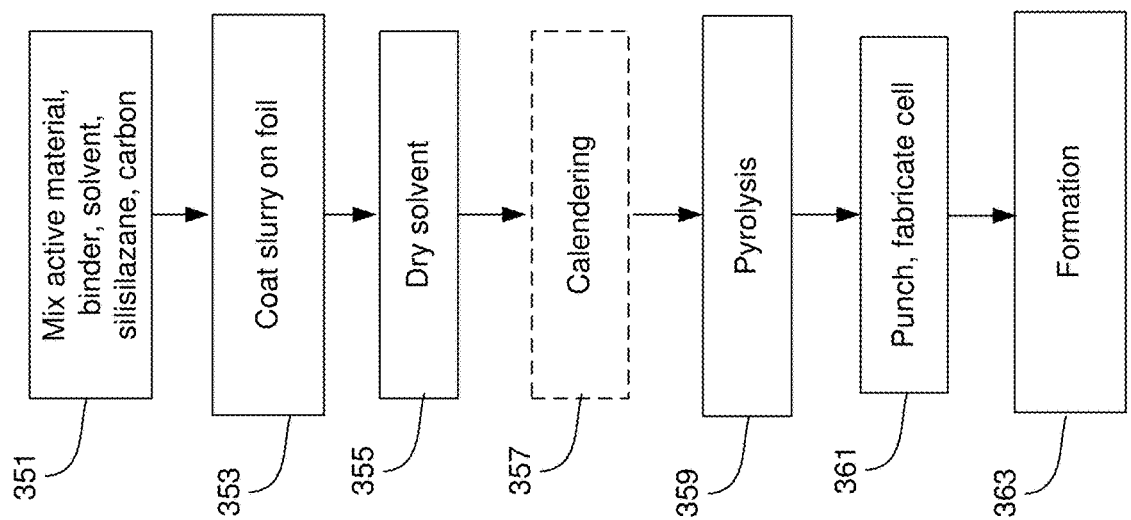
FIG. 3B is a flow diagram of a process for direct coating electrodes with silosilazane additive, in accordance with an example embodiment of the disclosure.

FIG. 3B is a flow diagram of a process for direct coating electrodes with silosilazane additive, in accordance with an example embodiment of the disclosure. This process comprises physically mixing the active material, conductive additive, and binder together, and coating it directly on a current collector. This example process comprises a direct coating process in which an anode slurry is directly coated on a copper foil using a binder such as CMC, SBR, Sodium Alginate, PAI, PAA, PI and mixtures and combinations thereof. Another example process comprising forming the active material on a substrate and then transferring to the current collector is described with respect to FIG. 3A.

In step 351, the raw electrode active material may be mixed using a binder/resin (such as PI, PAI), solvent, and conductive carbon. For example, graphene/VGCF (1:1 by weight) may be dispersed in NMP under sonication for, e.g., 1 hour followed by the addition of Super P (1:1:1 with VGCF and graphene) and additional sonication for, e.g., 45-75 minutes. Silicon powder with a desired particle size, may then be dispersed in polyamic acid resin (15% solids in N-Methyl pyrrolidone (NMP)) at, e.g., 1000 rpm in a ball miller for a designated time, and then the conjugated carbon/NMP slurry may be added and dispersed at, e.g., 2000 rpm for, e.g., another predefined time to achieve a slurry viscosity within 2000-4000 cP and a total solid content of about 30%. The particle size and mixing times may be varied to configure the active material density and/or roughness.

In step 353, the slurry may be coated on the foil at a loading of, e.g., 3-4 mg/cm$^2$, which may undergo drying in step 355 resulting in less than 15% residual solvent content. In step 357, an optional calendering process may be utilized where a series of hard pressure rollers may be used to finish the film/substrate into a smoother and denser sheet of material.

In step 359, the active material may be pyrolyzed by heating to 500-800 C such that carbon precursors are partially or completely converted into glassy carbon. The pyrolysis step may result in an anode active material having silicon content greater than or equal to 50% by weight, where the anode has been subjected to heating at or above 400 degrees Celsius. Pyrolysis can be done either in roll form or after punching in step 361. If done in roll form, the punching is done after the pyrolysis process. The punched electrode may then be sandwiched with a separator and cathode with electrolyte to form a cell. In step 363, the cell may be subjected to a formation process, comprising initial charge and discharge steps to lithiate the anode, with some residual lithium remaining.

Figure 4:
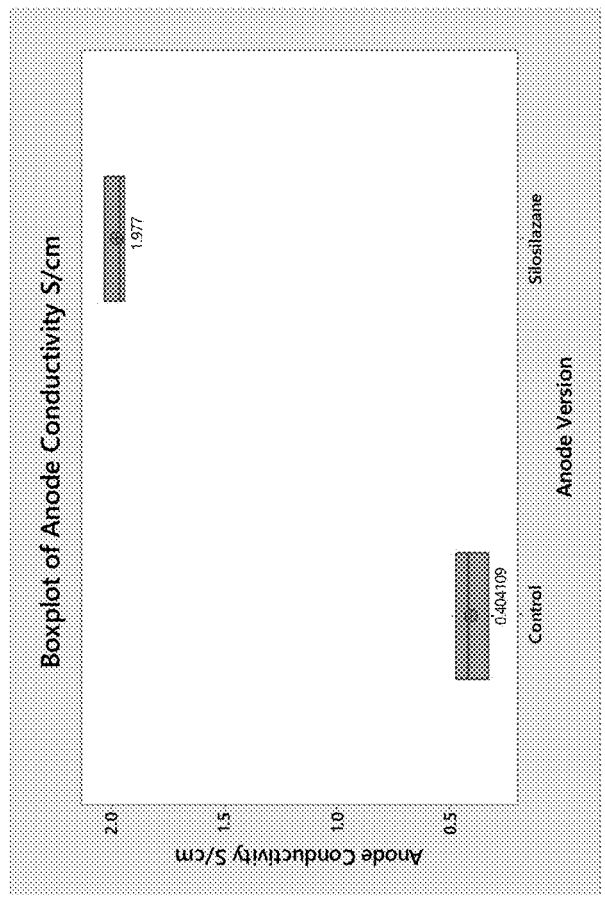
FIG. 4 illustrates a boxplot of anode conductivity of control anodes and anodes with silosilazane additive, in accordance with an example embodiment of the disclosure.

FIG. 4 illustrates a boxplot of anode conductivity of control anodes and anodes with silosilazane additive, in accordance with an example embodiment of the disclosure. Referring to FIG. 4, there is shown anode conductivity plot 400 for control silicon-dominant anodes and silicon-dominant anodes with silosilazane additive. As seen in the plot, the control anodes have a mean conductivity of 0.4041 S/cm, while the silosilazane additive anodes have a mean conductivity of 1.977 S/cm, nearly five times higher, illustrating the improvement in conductivity resulting from silosilazane additives in silicon-dominant anodes.

Figure 5:
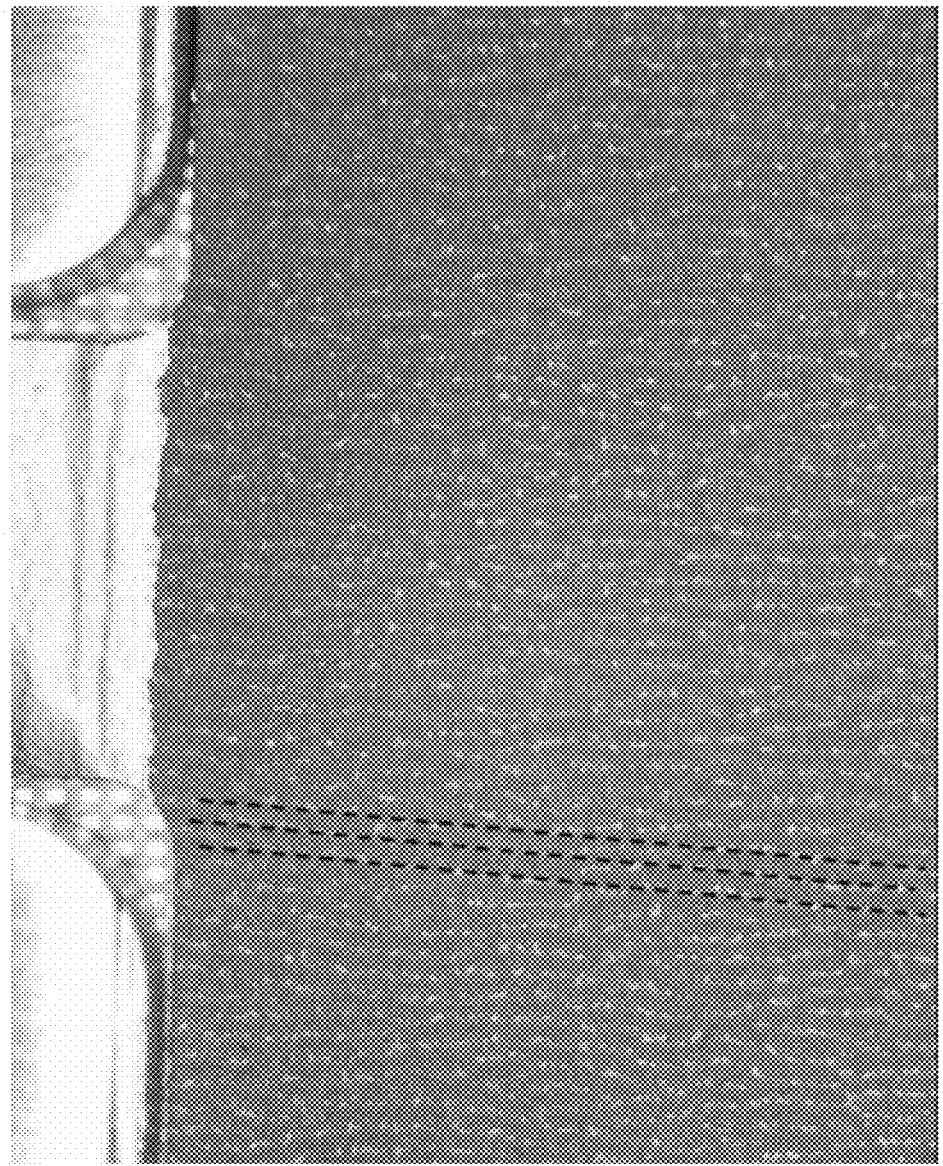
FIG. 5 shows an optical image of a silicon-dominant anode with silosilazane additive, in accordance with an example embodiment of the disclosure.

FIG. 5 shows an optical image of a silicon-dominant anode with silosilazane additive, in accordance with an example embodiment of the disclosure. Referring to FIG. 5, there is shown an image of a top surface of an anode. The current collector tab can be seen at the top of the image. The uniform patterns as indicated by the dashed lines may be as a result of the formation of a self-assembled silosilazane polymer during high temperature heat treatments, the self-assembled polymers due to specific interactions of hydrophilic and hydrophobic groups of the polymer or the mutual incompatibility of macromolecular fragments with other anode slurry components such as silicon.

The dashed black lines in FIG. 5 show the direction of the patterns on the anode. The width of the bare metal weldable tab is 7 mm and the peak-to-peak distance between the ridges is of the order of 100 um to 1000 um. These ridges may provide strain relief/absorption of strain from swelling of the anode during lithiation.

Figure 6:
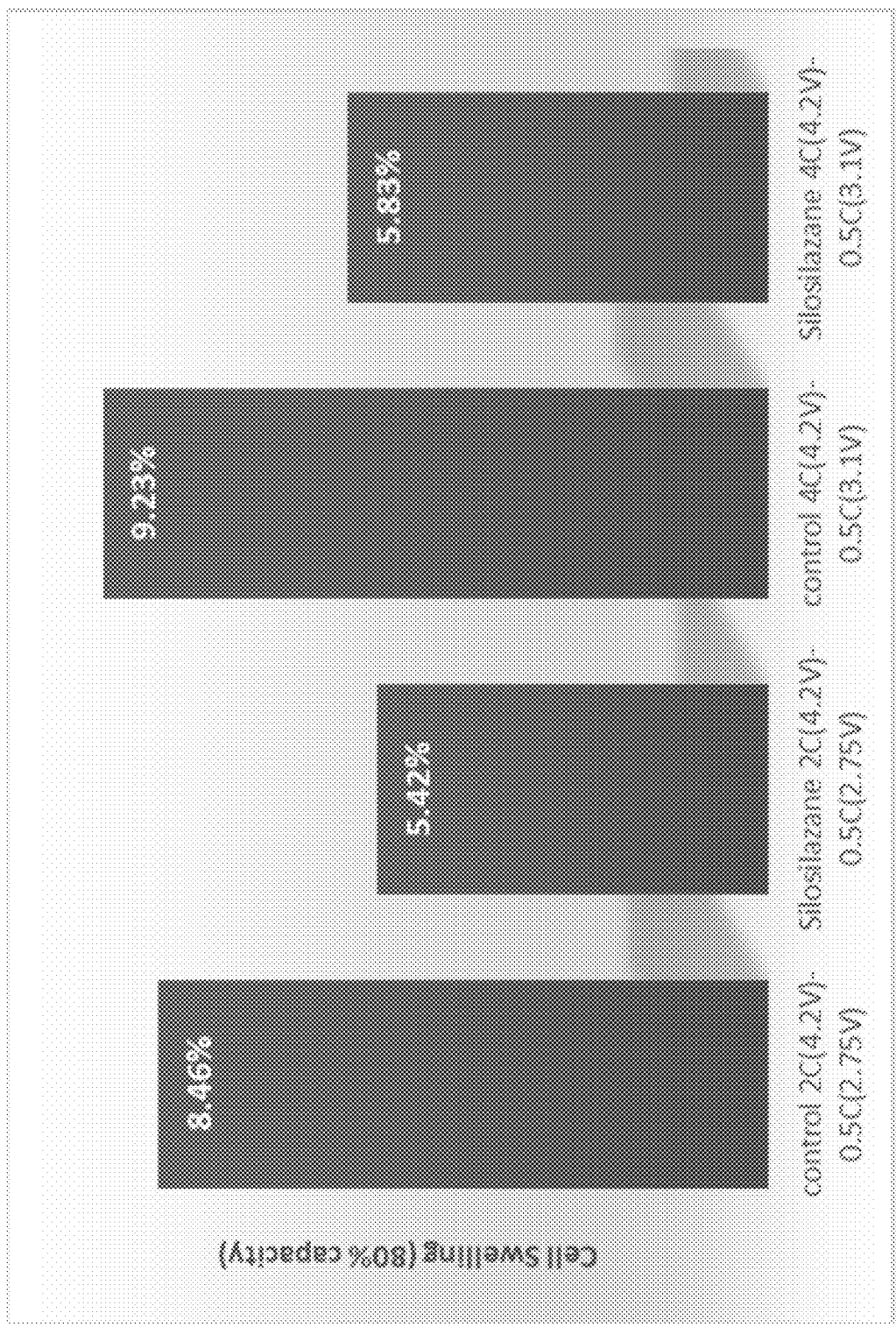
FIG. 6 illustrates cell swelling for control anodes and silosilazane additive anodes, in accordance with an example embodiment of the disclosure.

FIG. 6 illustrates cell swelling for control anodes and silosilazane additive anodes, in accordance with an example embodiment of the disclosure. Referring to FIG. 6, there is shown the percentage of cell swelling measured at 80% of capacity. For the first two bars of the chart, the cells were charged to 4.2V at a 2 C rate and discharged to 2.75 V at 0.5 C rate, while the third and fourth bars show swelling for cells charged to 4.2V at a 4 C rate and discharged to 3.1V at 0.5 C. As shown in the plot, the control anode cell swells 8.46% and 9.23% compared to 5.42% and 5.83% for the silosilazane additive anode cell. This may be due to the presence of patterns on the anode, such as those shown in FIG. 5, that provide a void space for silicon expansion and contraction during cycling.

Figure 7:
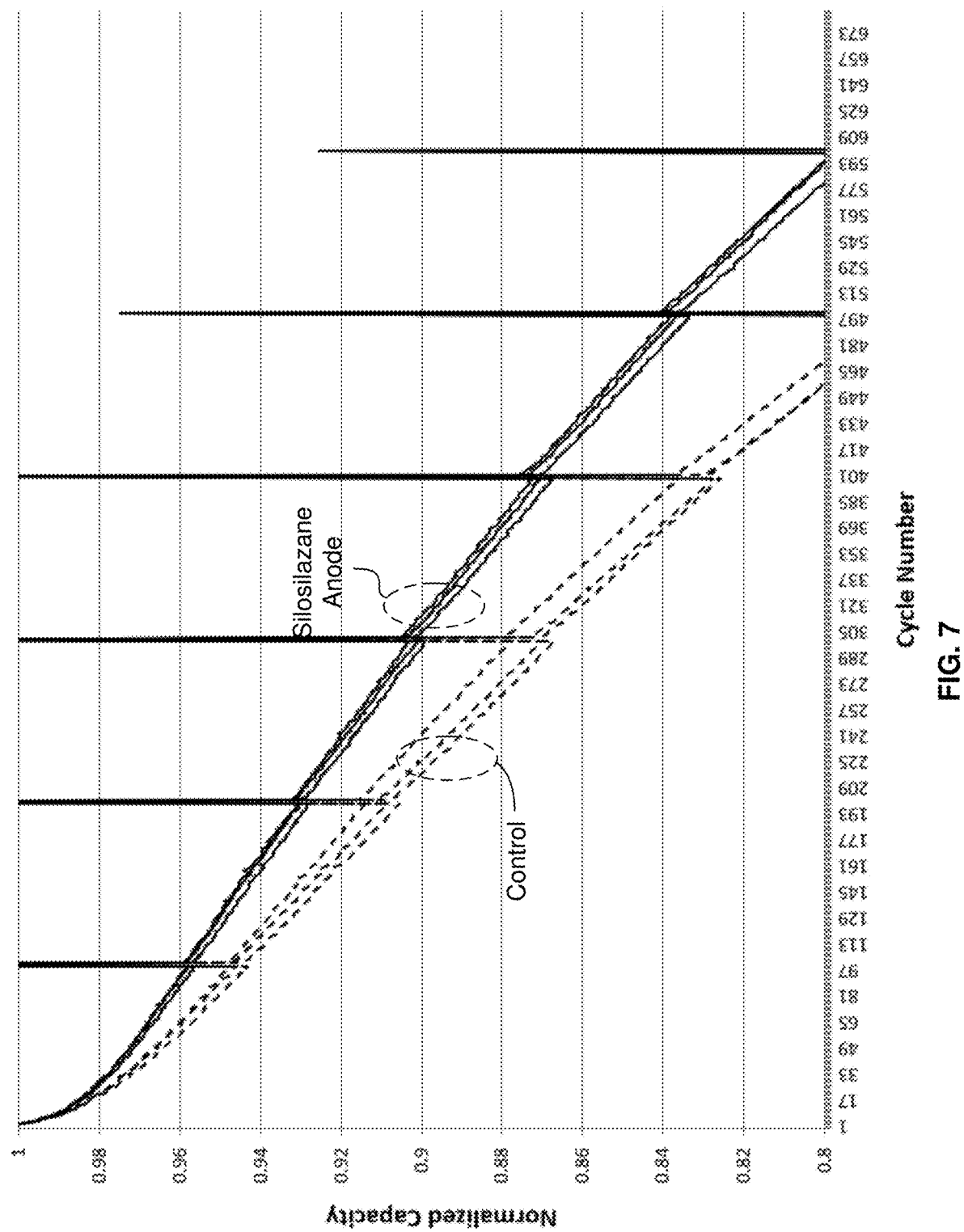
FIG. 7 illustrates cycling performance for control silicon-dominant anode cells and silosilazane additive silicon-dominant anode cells, in accordance with an example embodiment of the disclosure

FIG. 7 illustrates cycling performance for control silicon-dominant anode cells and silosilazane additive silicon-dominant anode cells, in accordance with an example embodiment of the disclosure. Referring to FIG. 7, the plot compares the cycling performance of the standard anode (control) with silosilazane anodes (solid lines) at a charge rate of 1 C and discharge rate of 0.5 C between 4.2-3.1 volts. The result shows that addition of the silosilazane improves the performance of the standard anode, with the normalized capacity of the silosilazane anode cells demonstrating higher capacity through ~600 cycles with 80% of capacity remaining while the control anodes drop to 80% at ~460 cycles.

Figure 8:
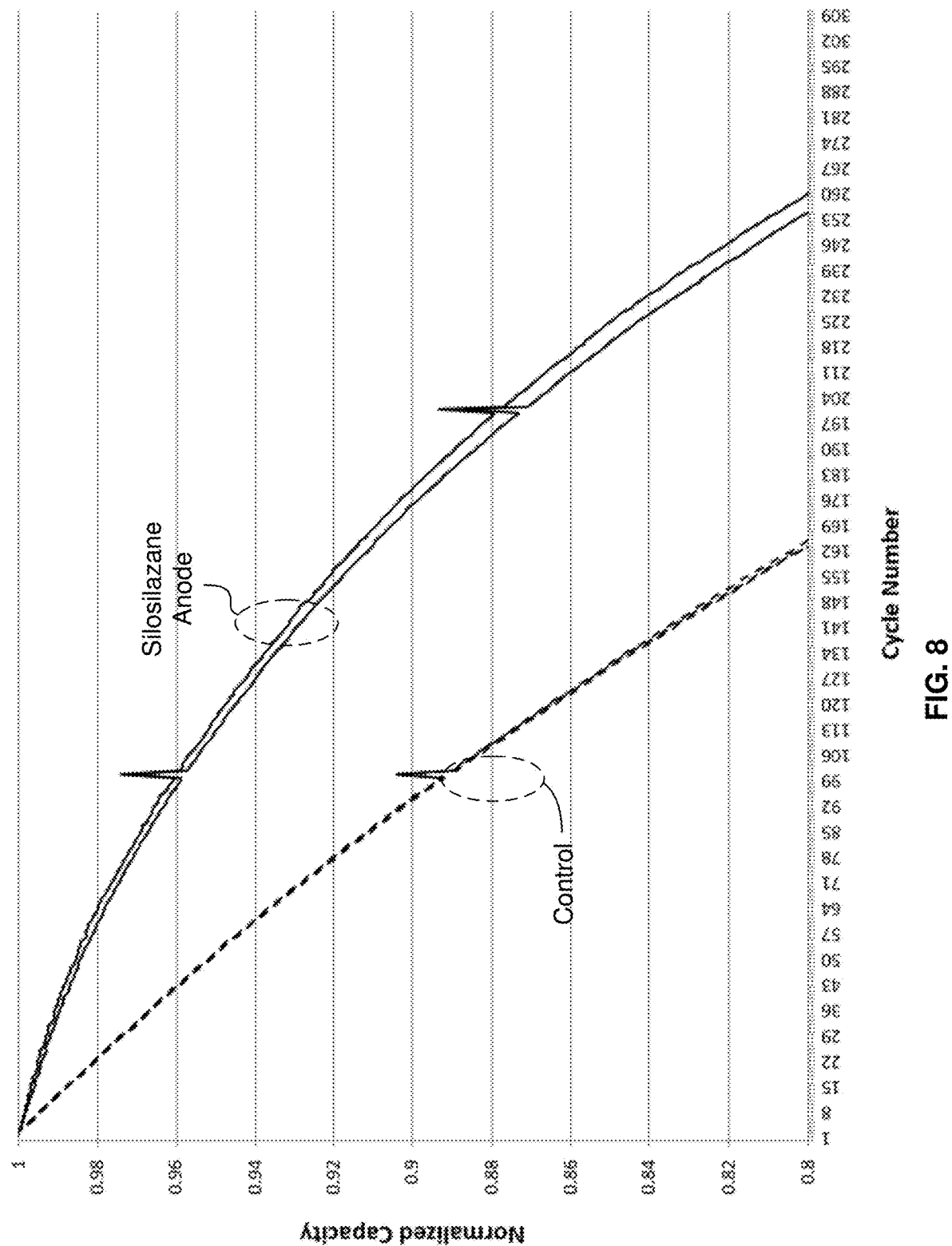
FIG. 8 illustrates cycling performance with higher charge rate for control silicon-dominant anode cells and silosilazane additive silicon-dominant anode cells, in accordance with an example embodiment of the disclosure.

FIG. 8 illustrates cycling performance with higher charge rate for control silicon-dominant anode cells and silosilazane additive silicon-dominant anode cells, in accordance with an example embodiment of the disclosure. Referring to FIG. 8, the plot shows galvanostatic cycling performance of silicon-dominant anodes (control) versus the silosilazane anode at 2 C-charge and 0.5 C-discharge between 4.2-2.75 volts. The result shows that the addition of the silosilazane improves the performance of the standard anode, with the normalized capacity of the silosilazane anode cell demonstrating higher capacity through ~250 cycles with 80% of capacity remaining while the control anodes drop to 80% after ~160 cycles.

Figure 9:
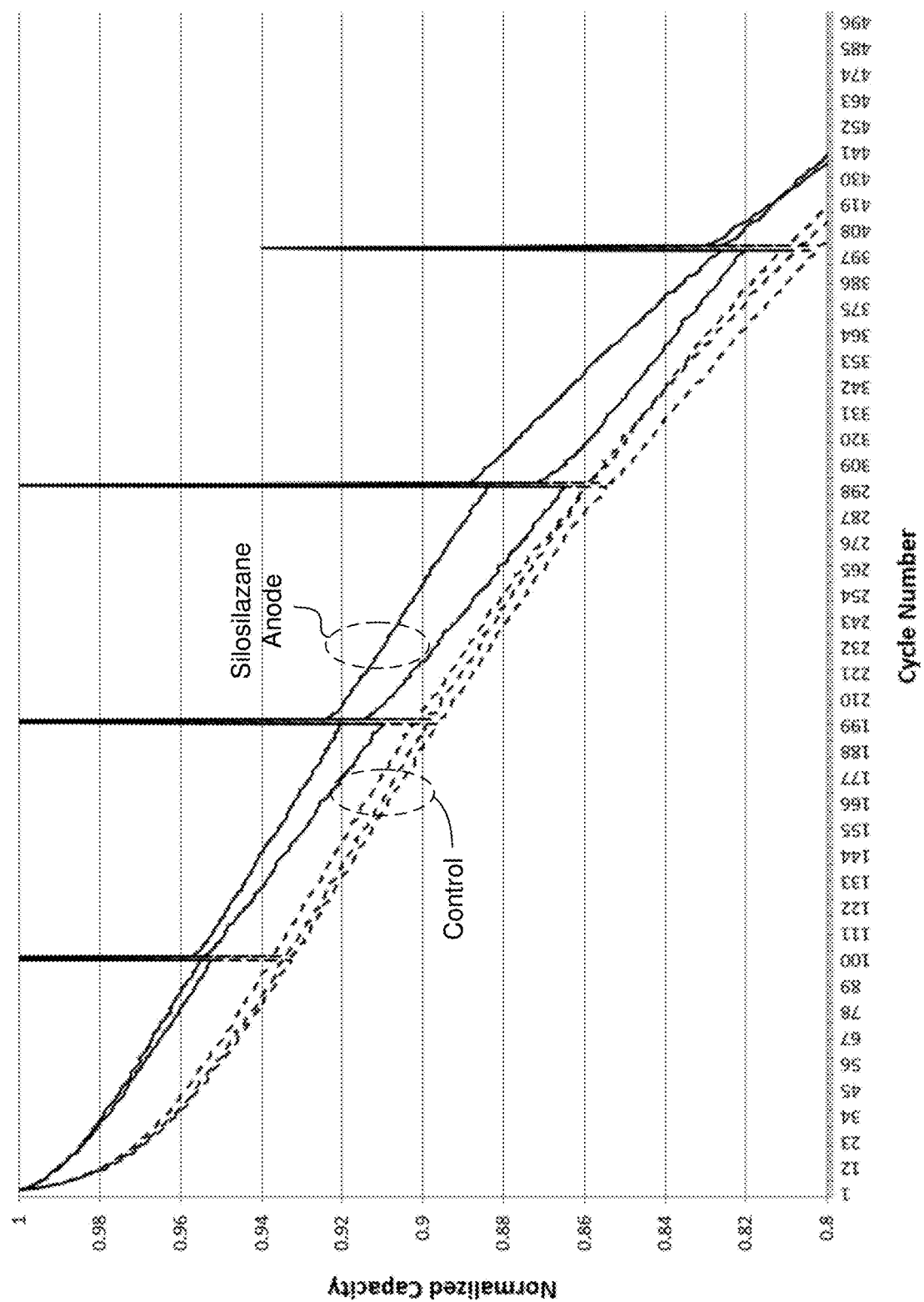
FIG. 9 illustrates cycling performance with a 4 C charge rate for control silicon-dominant anode cells and silosilazane additive silicon-dominant anode cells, in accordance with an example embodiment of the disclosure.

FIG. 9 illustrates cycling performance with a 4 C charge rate for control silicon-dominant anode cells and silosilazane additive silicon-dominant anode cells, in accordance with an example embodiment of the disclosure. Referring to FIG. 9, the plot compares the cycling performance of the silicon-dominant control anodes (control) with silosilazane anode cells at a charge rate of 4 C and discharge rate of 0.5 C between 4.2-3.1 volts. The result shows that addition of the silosilazane improves the performance of the standard anode, with the normalized capacity of the silosilazane anode cell demonstrating higher capacity through ~450 cycles with 80% of capacity remaining while the control cells drop to 80% after ~410 cycles.

Figure 10:
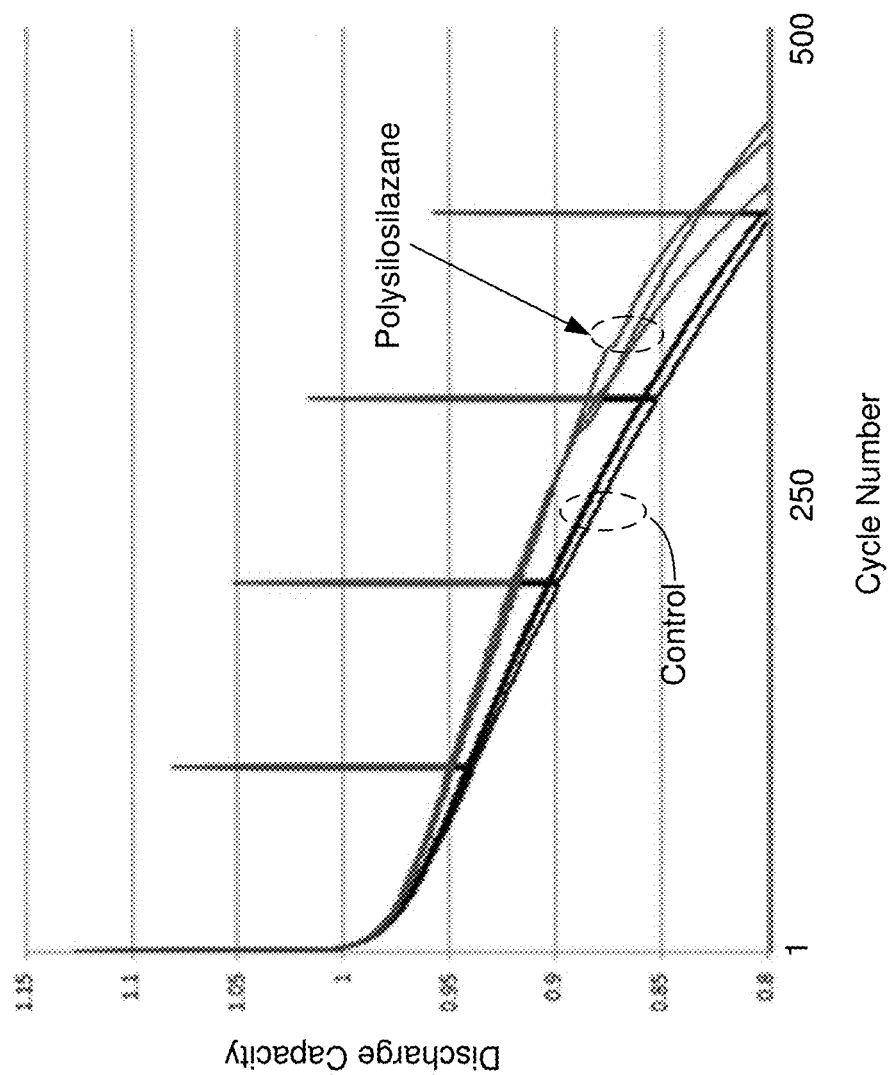
FIG. 10 illustrates cell performance with anodes comprising silicon pretreated with polysilosilazane, in accordance with an example embodiment of the disclosure.

FIG. 10 illustrates cell performance with anodes comprising silicon pretreated with polysilosilazane, in accordance with an example embodiment of the disclosure. Referring to FIG. 10, there is shown cycle performance of cells where silicon in the anodes was pretreated with polysilosilazane by a pyrolysis procedure.

In this example, silicon may be pyrolyzed at 1100-1200° C. with polysilosilazane and NMP for 45-75 minutes. The pretreated silicon may be ball milled and used in a standard anode slurry. This treated slurry, as well as a standard slurry without polysilosilazane, are used to fabricate 5-layer pouch cells, and the cells are cycled at 4 C charge and 0.5 C discharge between 4.2-3.1 V for the data shown in FIG. 10. As seen in the plot, the cells with polysilosilazane treated anodes demonstrate better cycle life as compared to control cells.

Different concentrations of polysilosilazanes with respect to the weight percentage of silicon may be utilized, and excellent performance may be obtained from cells built using anodes with 1% polymer pretreated silicon. The adoption of the pretreatment process allows ease during mixing process since there is no bare polymer in the slurry, thereby avoiding gelling. This process can also be used to couple polysilosilazane pretreated silicon with AEAPTMS additive to get enhanced conjugation between the silicon and carbon in the system.

Figure 11:
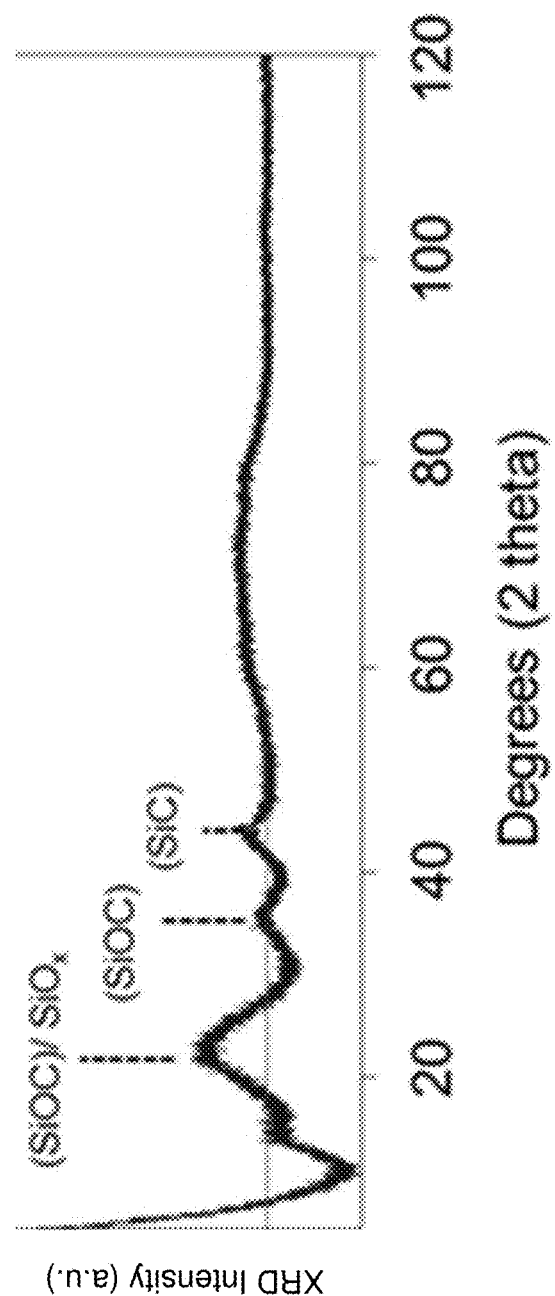
FIG. 11 illustrates material characterization data for a polyorganosiloxane additive silicon-dominant anode, in accordance with an example embodiment of the disclosure.

FIG. 11 illustrates material characterization data for a polyorganosiloxane additive silicon-dominant anode, in accordance with an example embodiment of the disclosure. Referring to FIG. 11, there is shown x-ray diffraction data for a polysiloxane resin after pyrolyzing. Silicon oxycarbides are ceramics that have chemical structures with silicon bonded to both oxygen and carbon simultaneously. In an example scenario, anodes comprise polymer and metal oxide/ceramic coating applied in combination with polyorganosiloxane/SiOC.

Polyorganosiloxane resin converts to oxycarbide and/or silicon carbide upon heat treatment at 1150-1250° C. under an argon atmosphere. The x-ray data in FIG. 11 demonstrates the conversion of polyorganosiloxane to silicon oxycarbide. Silicon oxycarbide can be suspended within the anode matrix or coated on to the surface of the Si anode. The peaks in the x-ray data illustrate the presence of $SiOC/SiO_x$, SiOC, and SiC. The carbonized product of organopolysiloxane resin is less crystalline and shows broad x-ray peaks in the x-ray data of FIG. 11, which correspond to SiOC and SiC peaks, which is an indication of the formation of SiOC+SiC mixture under high temperature pyrolyzing conditions. However, nanocrystalline SiC can also form during a heat treatment process.

The pyrolysis process of polymeric resin precursors results in carbon incorporation to $SiO_2$ to form SiOC. The composition of the silicon oxycarbides may be varied from 1 to 20% by weight of the silicon-dominant anode active material and the polymerization of this material may range up to a molecular weight of 6000, or 6 kDa where Da is dalton (1 Da=1 g/mol). The low density (2.1 g/cm$^3$) and open structure of SiOC structures enable high gravimetric capacity with high charge and discharge rates. The electrochemical capacity in SiOC is mainly due to reversible Li-adsorption in the disordered carbon phase and not the conventional alloying reaction similar to Si. Thus, incorporation of SiOC can significantly improve efficiency of Li ion incorporation to Si. Finally, graphite may be added to the anode in addition to the polyorganosiloxane so that the final anode contains both graphite/graphene and SiOC, where the graphite/graphene may significantly improve the conductivity of the silicon layer.

Figure 12:
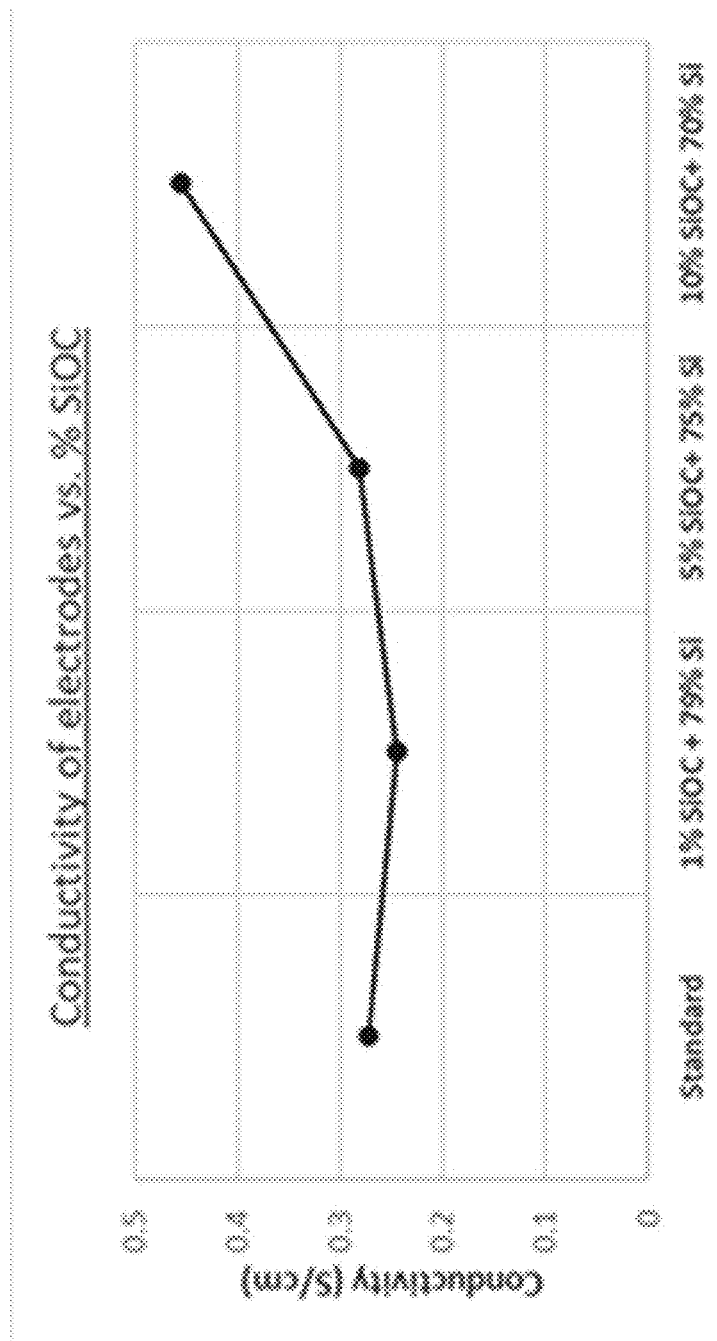
FIG. 12 illustrates electrode conductivity for various silicon-dominant anodes with added silicon oxycarbides, in accordance with an example embodiment of the disclosure.

FIG. 12 illustrates electrode conductivity for various silicon-dominant anodes with added silicon oxycarbides, in accordance with an example embodiment of the disclosure. Referring to FIG. 12, there is shown conductivity measurements for a standard silicon-dominant anode and for anodes with 1%, SiOC, 5% SiOC, and 10% SiOC. As shown in the conductivity plot, the conductivity of the silicon-dominant anode is improved by adding silicon oxycarbides. Additionally, incorporation of Si—C—Si bonds can promote the formation of conductive islands within the electrode matrix or on the surface of Si particles. The 10% SiOC anode demonstrates ~0.45 S/cm as compared to ~0.28 S/cm for a control anode.

Figure 13:
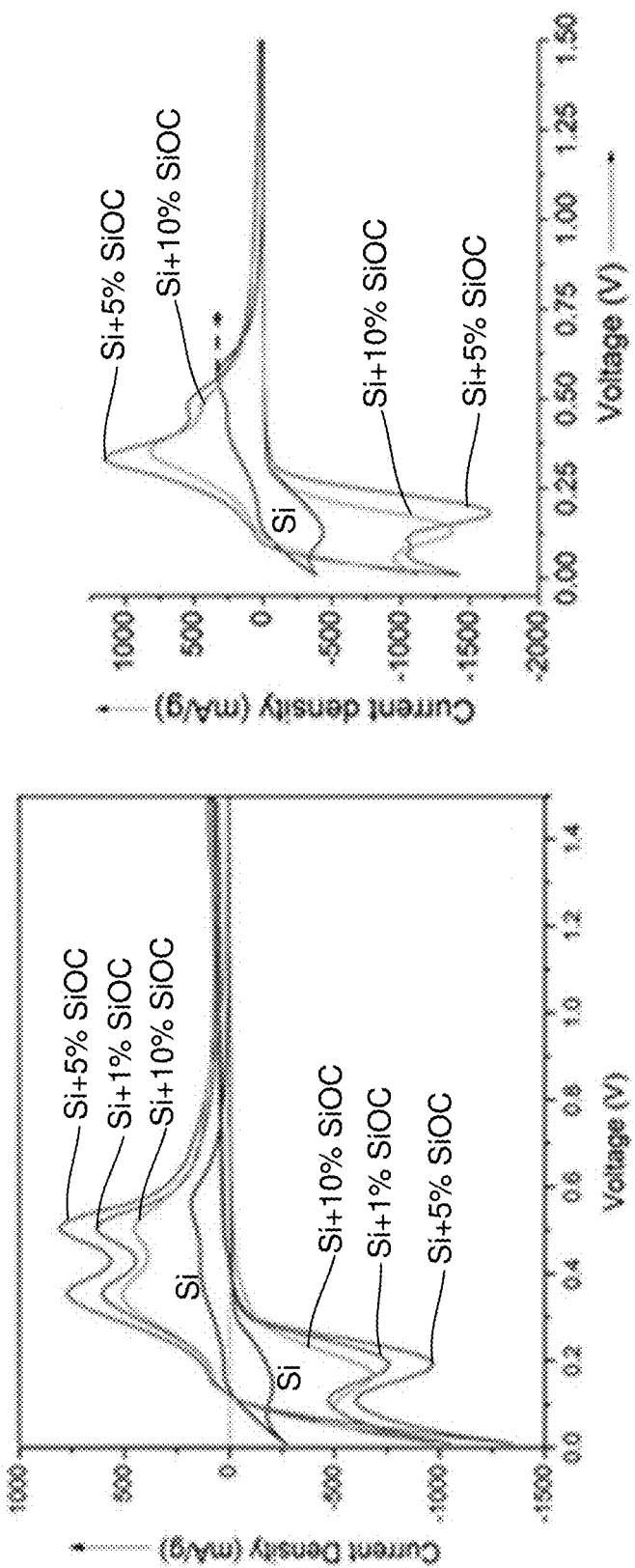
FIG. 13 illustrates cyclic voltammetric analysis of half coin cells for different SiOC compositions, in accordance with an embodiment of the disclosure.

FIG. 13 illustrates cyclic voltammetric analysis of half coin cells for different SiOC compositions, in accordance with an embodiment of the disclosure. Referring to FIG. 13, there is shown current density versus voltage measurements at the 4th cycle (left) and 7$^{th}$ cycle (right). The presence of SiOC increased the current response in the cyclic voltammetric studies. Anodes prepared with Si+SiOC do not show significant redox peak shift (hysteresis) compared to the standard Si (labeled Si) anode after cycling. This is mainly due to the improved conductivity on the surface of silicon, which can also be beneficial for fast charging performance.

Figure 14:
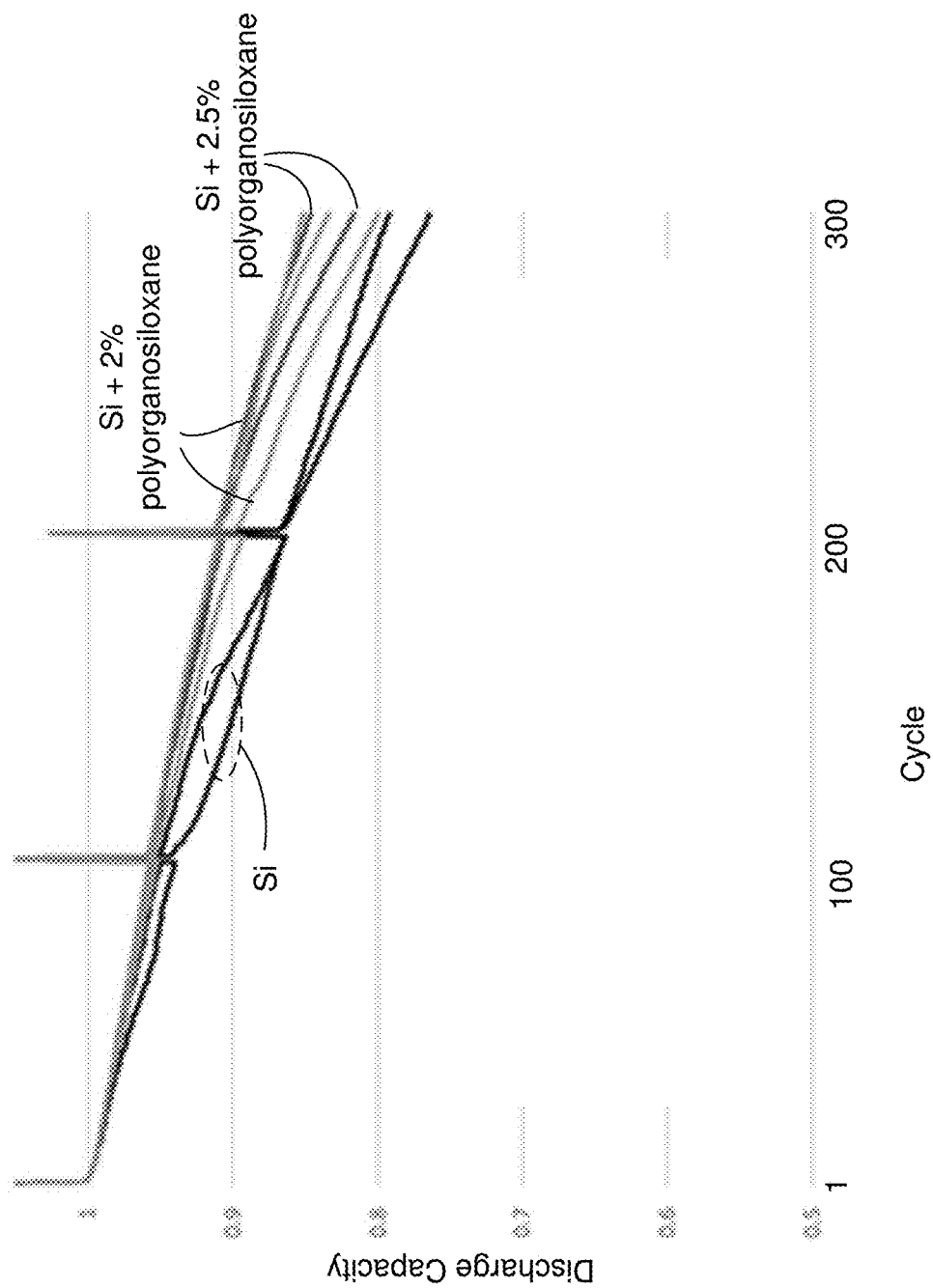
FIG. 14 illustrates capacity retention of silicon-dominant anodes with polyorganosiloxane and control anodes, in accordance with an example embodiment of the disclosure.

FIG. 14 illustrates capacity retention of silicon-dominant anodes with polyorganosiloxane and control anodes, in accordance with an example embodiment of the disclosure. Referring to FIG. 14, there is shown capacity retention plots for silicon-dominant anodes as well as silicon-dominant anodes with 2% and 5% polyorganosiloxane. Compared to the Si control anode, the introduction of SiOC improved the overall cycle life performance of composite Si anodes at a 4 C charge rate with ~10% greater capacity than the control anodes after 300 cycles.

Figure 15:
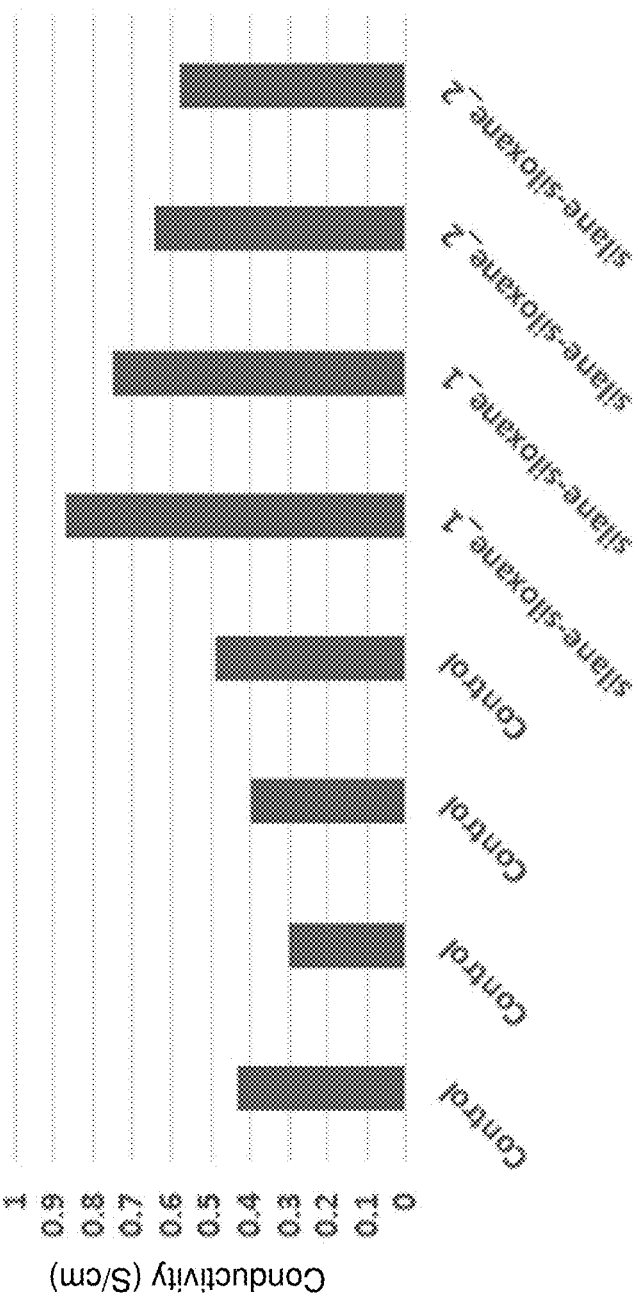
FIG. 15 illustrates conductivity of silicon-dominant control electrodes and electrodes with cyclic silosiloxane, in accordance with an example embodiment of the disclosure.

FIG. 15 illustrates conductivity of silicon-dominant control electrodes and electrodes with cyclic silosiloxane, in accordance with an example embodiment of the disclosure. For these anodes, a cyclic silosiloxane (1,3,5,7-tetramethyl-1,3,5,7-tetravinyl cyclotetrasiloxane) 20% was added to a solution of silane (AEAPTMS; 35%) and NMP (45%) to form a silane-siloxane solution. Additions of >20% siloxane may lead to the formation of non-soluble materials in the solution.

In an example scenario, 1 gram of this solution may be added to 6-7 grams of silicon, 8-10 grams of NMP and 14-18 grams resin, and then mixed to form a slurry with a viscosity of 5000 cp. This slurry was coated on PET, peeled, and treated at 1175° C. under argon gas to form a free-standing silicon dominant electrode film. The film was laminated on copper foil.

Referring to FIG. 15, the conductivity measurements shows the conductivity of the electrode versus control (without silane-siloxane additive) where the silane-siloxane anode is demonstrated to have better electronic conductivity than the control, with conductivity between 2 and 3 times higher than the control. Another possible additive material is cyclic 2,4,6,8-tetramethyl-2,4,6,8-tetravinyl cyclotetrasiloxane, which may be utilized to increase anode conductivity.

Figure 16:
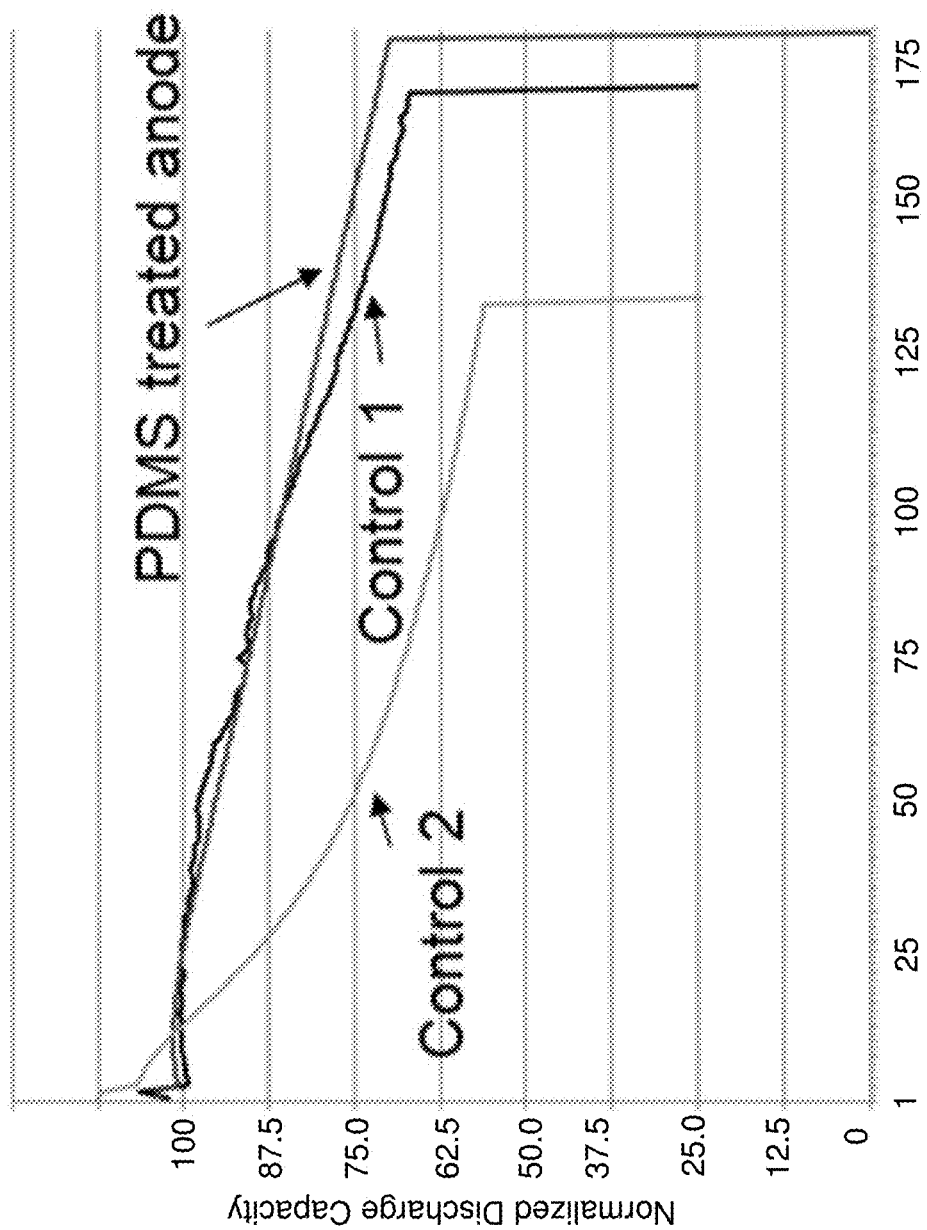
FIG. 16 illustrates cell performance for silicon-dominant anodes with polydimethylsiloxane as an additive, in accordance with an embodiment of the disclosure.

FIG. 16 illustrates cell performance for silicon-dominant anodes with polydimethylsiloxane as an additive, in accordance with an embodiment of the disclosure. Referring to FIG. 16, there is shown normalized discharge capacity for anodes with polydimethylsiloxane (PDMS) as an additive and control anodes. To form the PDMS additive anode, silicon powder may be treated with PDMS at high temperature e.g., >1000° C., under an argon atmosphere. In one example, the ratio of PDMS to silicon is approximately 1:1. The product may be crushed and milled into a powder to be used as the silicon source in a slurry comprising 32% solvent, 20 percent silicon, and 48 percent resin. This slurry may be coated on PET, peeled, and treated at 1175° C. under argon gas to form a free-standing silicon-dominant electrode film, which may then be laminated on copper foil. FIG. 16 shows the performance of the cell with PDMS-treated silicon anode (75% silicon) versus two controls. Control 1 contains 85% silicon and control 2 contains 75% silicon. The plot shows that there is some improvement in cycle life with PDMS as an additive in silicon-dominant anodes.

In an example embodiment of the disclosure, a method and system is described for silosilazanes as additives for silicon-dominant anodes in a battery that may include a cathode, an electrolyte, and an anode active material. The active material may comprise 50% or more silicon and an additive comprising one or more of: silosilazane, silicon oxycarbides, and polyorganosiloxane. The silosilazane may comprise one or more amine groups. The silosilazane may comprise one or more of: silanols, silyl ethers, sylil chlorides, dialkylamoinosilanes, silyl hydrides, and cyclic azasilanes. The active material may comprise a film with a thickness between 10 and 80 microns. The film may have a conductivity of 1 S/cm or more. The active material may comprise between 50% and 95% silicon. The active material may be held together by a pyrolyzed carbon film. The anode may comprise lithium, sodium, potassium, silicon, and/or mixtures and combinations thereof. The battery may comprise a lithium ion battery. The electrolyte may comprises a liquid, solid, or gel.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A battery, the battery comprising:
a cathode, an electrolyte, and an anode comprising an active material, the active material comprising:
silicon particles; and
an additive comprising silosilazane wherein said silosilazane comprises one or more amine groups and one or more of: silyl chlorides, dialkylaminosilanes, and cyclic azasilanes.

2. The battery according to claim 1, wherein the active material comprises a film with a thickness between 10 microns and 80 microns.

3. The battery according to claim 1, wherein the active material is held together by a pyrolyzed carbon film.

4. The battery according to claim 1, wherein the anode comprises lithium, sodium, potassium, silicon, and/or mixtures and combinations thereof.

5. The battery according to claim 1, wherein the active material comprises a coating comprising one or more of: a metal oxide, a ceramic, and a polymer.

6. The battery according to claim 1, wherein the electrolyte comprises a liquid, solid, or gel.

7. A method of forming a battery, the method comprising:
forming a battery comprising an anode, a cathode, and an electrolyte, the anode comprising a silicon-dominant active material that comprises silicon particles and an additive comprising silosilazane; wherein said silosilazane comprises one or more amine groups and one or more of: silyl chlorides, dialkylaminosilanes, and cyclic azasilanes.

8. The method according to claim 7, wherein the silicon-dominant material is formed by coating a substrate with a slurry comprising a carbon binder, silicon particles, and silosilazane.

9. The method according to claim 7, wherein the active material comprises a film with a thickness between 10 microns and 80 microns.

10. The method according to claim 7, wherein the active material is held together by a pyrolyzed carbon material.

11. The method according to claim 7, wherein the active material comprises a coating comprising one or more of: a metal oxide, a ceramic, and a polymer.

12. An anode for a battery, the anode comprising:
an active material on a conductive current collector, wherein the active material comprises:
silicon particles;
carbon; and
an additive comprising silosilazane; wherein said silosilazane comprises one or more amine groups and one or more of: silyl chlorides, dialkylaminosilanes, and cyclic azasilanes.

* * * * *